(12) United States Patent
Schmidt

(10) Patent No.: US 11,066,290 B2
(45) Date of Patent: Jul. 20, 2021

(54) ELECTRIC FUEL SHUTOFF DEVICE

(71) Applicant: Chemoil Corporation, Oklahoma City, OK (US)

(72) Inventor: Brennan Schmidt, Weatherford, OK (US)

(73) Assignee: CHEMOIL CORPORATION, Oklahoma City, OK (US)

( * ) Notice: Subject to any disclaimer, the term of this patent is extended or adjusted under 35 U.S.C. 154(b) by 0 days.

(21) Appl. No.: 16/933,675

(22) Filed: Jul. 20, 2020

(65) Prior Publication Data

US 2021/0017013 A1   Jan. 21, 2021

Related U.S. Application Data

(60) Provisional application No. 62/876,309, filed on Jul. 19, 2019.

(51) Int. Cl.
| | | |
|---|---|---|
| *B67D 7/36* | (2010.01) | |
| *G05D 9/12* | (2006.01) | |
| *B67D 7/04* | (2010.01) | |
| *B67D 7/78* | (2010.01) | |
| *G05D 7/00* | (2006.01) | |
| *G05D 7/06* | (2006.01) | |
| *B67D 7/62* | (2010.01) | |

(52) U.S. Cl.
CPC ............ *B67D 7/04* (2013.01); *B67D 7/36* (2013.01); *B67D 7/78* (2013.01); *G05D 7/00* (2013.01); *G05D 7/0617* (2013.01); *G05D 9/12* (2013.01); *B67D 7/62* (2013.01); *B67D 2007/0444* (2013.01)

(58) Field of Classification Search
CPC ... B67D 7/04; B67D 7/36; B67D 7/78; B67D 7/62; B67D 2007/0444; G05D 7/00; G05D 7/0617; G05D 9/12
See application file for complete search history.

(56) References Cited

U.S. PATENT DOCUMENTS

| | | |
|---|---|---|
| 7,421,895 B1 * | 9/2008 | Caldwell ............ G01F 23/2962 73/290 V |
| 9,371,830 B2 | 6/2016 | Moffitt, Jr. |
| 9,371,831 B2 | 6/2016 | Moffitt, Jr. |
| 9,751,749 B1 | 9/2017 | Moffitt, Jr. |
| 9,856,131 B1 | 1/2018 | Moffitt, Jr. |
| 10,017,374 B1 | 7/2018 | Moffitt, Jr. |

(Continued)

FOREIGN PATENT DOCUMENTS

CA   2693567 A1   10/2010

OTHER PUBLICATIONS

International Search Report and Written Opinion for International Application No. PCT/US2020/042658, report dated Oct. 22, 2020; pp. 1-13.

*Primary Examiner* — Jason K Niesz
(74) *Attorney, Agent, or Firm* — Bracewell LLP

(57) ABSTRACT

An electric fuel flow control device for use with oil and gas equipment, such as fueling systems for frac pumps. The electric fuel flow control device includes a battery, control circuitry, an enclosure that encloses the control circuity, and includes an electric fluid sensor, a valve, a beacon light, a status light, a button, an adapter cap enabling connection to a fuel tank, and a mandrel. The electric fuel flow control device may be used as a primary fuel flow control device or a backup fuel flow control device.

21 Claims, 4 Drawing Sheets

(56) References Cited

U.S. PATENT DOCUMENTS

| | | |
|---|---|---|
| 10,106,396 B1 | 10/2018 | Moffitt, Jr. |
| 10,604,403 B2 | 3/2020 | Schmidt |
| 2018/0099864 A1* | 4/2018 | Shock .................... B60P 3/035 |
| 2019/0119096 A1 | 4/2019 | Haile et al. |
| 2019/0270632 A1 | 9/2019 | Schmidt |
| 2019/0359475 A1 | 11/2019 | Schmidt |

* cited by examiner

ELECTRIC FUEL SHUTOFF DEVICE

CROSS-REFERENCE TO RELATED APPLICATIONS

This application claims priority from U.S. Provisional Application No. 62/876,309 filed Jul. 19, 2019, and titled "BATTERY OPERATED ELECTRIC FUEL SHUTOFF DEVICE." For purposes of United States patent practice, this application incorporates the contents of the Provisional Application by reference in its entirety.

BACKGROUND

Field of the Disclosure

The present disclosure generally relates to equipment used in the oil and gas industry. More specifically, embodiments of the disclosure relate to control and delivery of fuel to such equipment.

Description of the Related Art

Geological formations may contain deposits of hydrocarbons such as oil and/or natural gas. Using a variety of technologies, wells may be drilled into such geological formations to access these hydrocarbons. One such technology used in geologic formations having a low permeability is hydraulic fracturing ("fracking"). Fracking is frequently employed to artificially produce fractures in such geological formations to stimulate the flow of natural gas or oil to wellbores penetrating the formations, thereby increasing the volumes of hydrocarbons that can be recovered.

A wide variety of equipment is present at a wellsite. For example, hydraulic fracturing equipment ("frac" equipment) may include blenders, fracturing pumps, and a monitoring unit. Other equipment includes a storage unit, hoses, and gauges that can operate over a range of pressures and injection rates. The equipment may be powered by gas or diesel engines.

Fuel may be delivered to the gas or diesel engines manually or using fuel pumps to deliver fuel to fuel tanks. Manual fuel systems rely on personnel to remember to regularly refuel all equipment fuel tanks on location and are prone to human error. Conventional fuel systems with fuel pumps may have a large number of potential failure points and minimal to no backup devices to ensure that fuel is delivered reliably and safely. The failure to deliver fuel to fuel tanks, fuel pumps, or other equipment when needed may result in premature ending of a fracking operation or damage to a well.

SUMMARY

Figure 1:
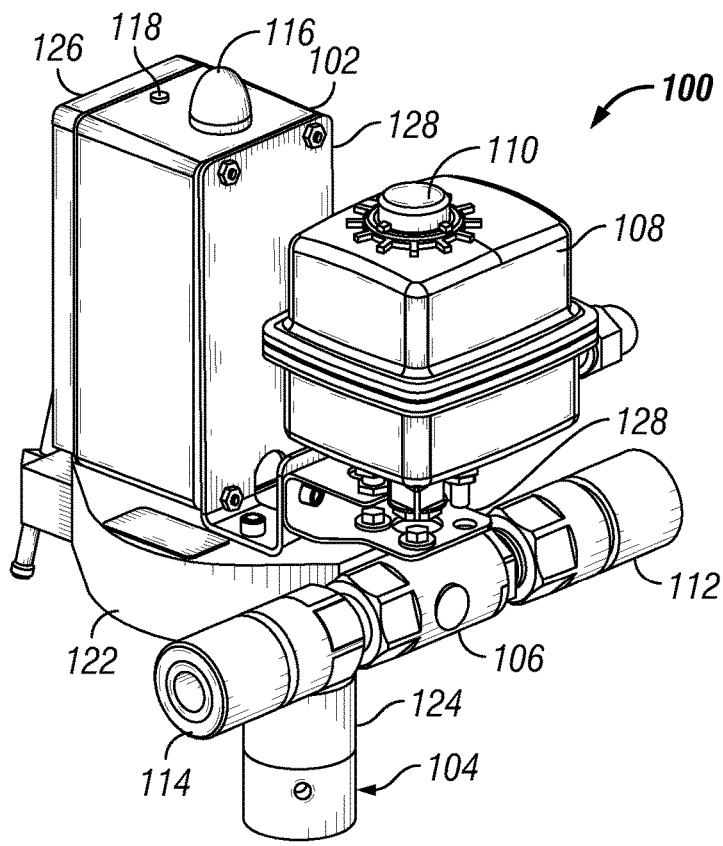
FIGS. 1 and 2 are 3-D perspective views of an electric fuel flow control device in accordance with an embodiment of the disclosure.

In one embodiment, a fuel flow control device is provided. The fuel flow control device includes an enclosure containing control circuity and a valve having an inlet and an outlet, the valve moveable between an open position and a closed position, the open position configured to enable fuel flow through the valve and the closed position configured to block fuel flow through the valve. The fuel flow control device further includes a valve actuator operable to move the valve between the open position and the closed position and an electric fuel sensor disposed in a sensor housing and having a shaft extending into the fuel tank, the shaft having a slot such that the electric fuel sensor senses fuel when the slot is submerged in fuel. The fuel flow control device further includes an adapter cap configured to couple the fuel flow control device to the fuel tank and a battery configured to power the control circuitry, the motorized valve, and the electric fuel sensor. The control circuity includes logic configured to move the valve between the open position and the closed position in response to a signal provided by the electric fuel sensor.

In some embodiments, the device includes a first light and second light, the first light configured to indicate an alarm and the second light configured to indicate operation of the electric fuel sensor. In some embodiments, the device includes a button configured to initiate operation of the electric fuel sensor. In some embodiments, the button is further configured to reset the motorized valve to the open position. In some embodiments, the valve is a motorized ball valve. In some embodiments, the valve is a solenoid valve. In some embodiments, the fuel flow control device includes a mandrel configured to adjust the depth of the electric fuel sensor in the fuel tank. In some embodiments, the fuel flow control device includes a sliding clamp configured to couple the fuel flow control device to a fuel tank. In some embodiments, the fuel flow control device includes a bracket coupled to the enclosure, the adapter cap, and the valve actuator.

In another embodiment, a method of controlling fuel provided to a fuel tank is provided. The method includes using a fuel flow control device coupled to the fuel tank, the fuel flow control device operable to stop the flow of fuel between an inlet and an outlet when the fuel flow control device detects fuel via an electric fuel sensor extending into the fuel tank. The fuel flow control device includes an enclosure containing control circuity and a valve having an inlet and an outlet, the valve moveable between an open position and a closed position, the open position configured to enable fuel flow through the valve and the closed position configured to block fuel flow through the valve. The fuel flow control device further includes a valve actuator operable to move the valve between the open position and the closed position and an electric fuel sensor disposed in a sensor housing and having a shaft extending into the fuel tank, the shaft having a slot such that the electric fuel sensor senses fuel when the slot is submerged in fuel. The fuel flow control device further includes an adapter cap configured to couple the fuel flow control device to the fuel tank and a battery configured to power the control circuit, the motorized valve, and the electric fuel sensor.

In some embodiments, the fuel tank is a fuel tank located on the suction side of an engine. In some embodiments, the fuel tank is a fuel tank located on the return side of an engine. In some embodiments, the fuel flow control device is connected to a feeder line of a gravity fed fuel system. In some embodiments, the fuel flow control device is connected to a feeder line of a pump powered fuel system. In some embodiments, the fuel flow control device is connected to a feeder line of a pump powered fuel system.

In another embodiment, a system is provided that includes an engine connected to a fuel tank and a fuel flow control device coupled to the fuel tank. The fuel flow control device includes an enclosure containing control circuitry and a valve having an inlet and an outlet, the valve moveable between an open position and a closed position, the open position configured to enable fuel flow through the valve and the closed position configured to block fuel flow through the valve. The fuel flow control device further includes a valve actuator operable to move the valve between the open position and the closed position and an electric fuel sensor disposed in a sensor housing and having a shaft extending into the fuel tank, the shaft having a slot such that the electric fuel sensor senses fuel when the slot is submerged in fuel. The fuel flow control device further includes an adapter cap configured to couple the fuel flow control device to the fuel tank and a battery configured to power the control circuitry, the motorized valve, and the electric fuel sensor. The control circuitry includes logic configured to move the valve between the open position and the closed position in response to a signal provided by the electric fuel sensor.

In some embodiments, the fuel tank is a suction side fuel tank located on the suction side of the engine. In some embodiments, the fuel tank is a return side fuel tank is a return side fuel tank located on the return side of the engine. In some embodiments, the engine provides power to a fracturing fluid pump. In some embodiments, the valve is a motorized ball valve.

In another embodiment, a fuel flow control device is provided. The fuel flow control device includes an enclosure containing control circuitry and a valve having an inlet and an outlet, the valve moveable between an open position and a closed position, the open position configured to enable fuel flow through the valve and the closed position configured to block fuel flow through the valve. The fuel flow control device further includes a valve actuator operable to move the valve between the open position and the closed position and means for sensing fluid in the fuel tank and generating a signal in response thereto. The fuel flow control device also includes an adapter cap configured to couple the fuel flow control device to the fuel tank. The control circuitry includes logic configured to move the valve between the open position and the closed position in response to the signal.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Figure 2:
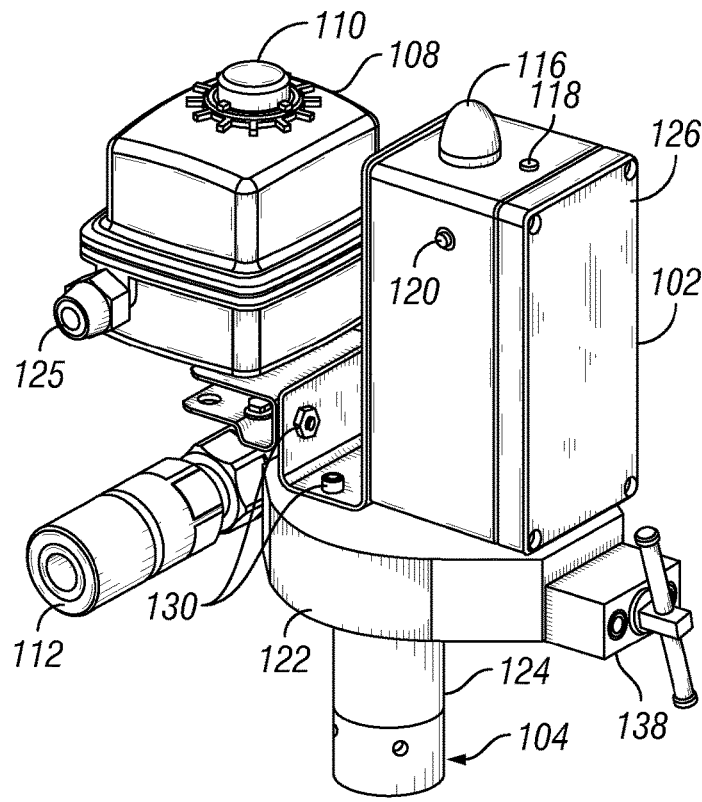
Figure 3:
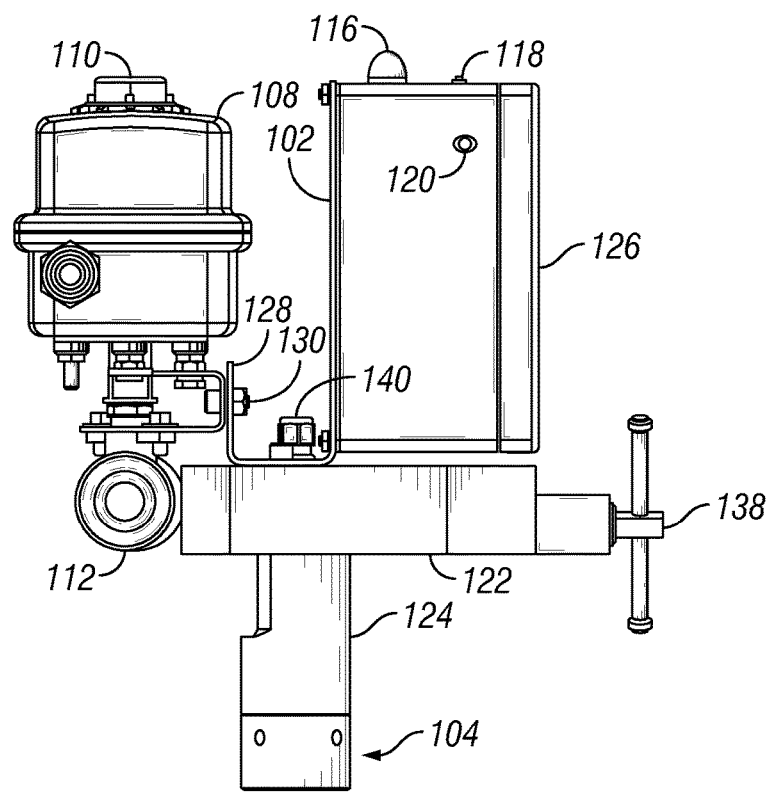
FIG. 3 is a 3-D side view of the electric fuel flow control device of FIGS. 1 and 2 in accordance with an embodiment of the disclosure.
Figure 4:
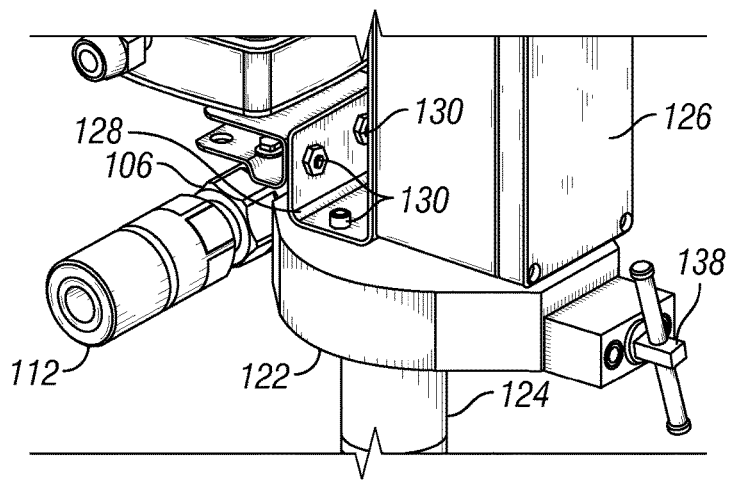
FIG. 4 is a 3-D close-up view of a portion of the electric fuel flow control device of FIGS. 1-3 in accordance with an embodiment of the disclosure.
Figure 5:
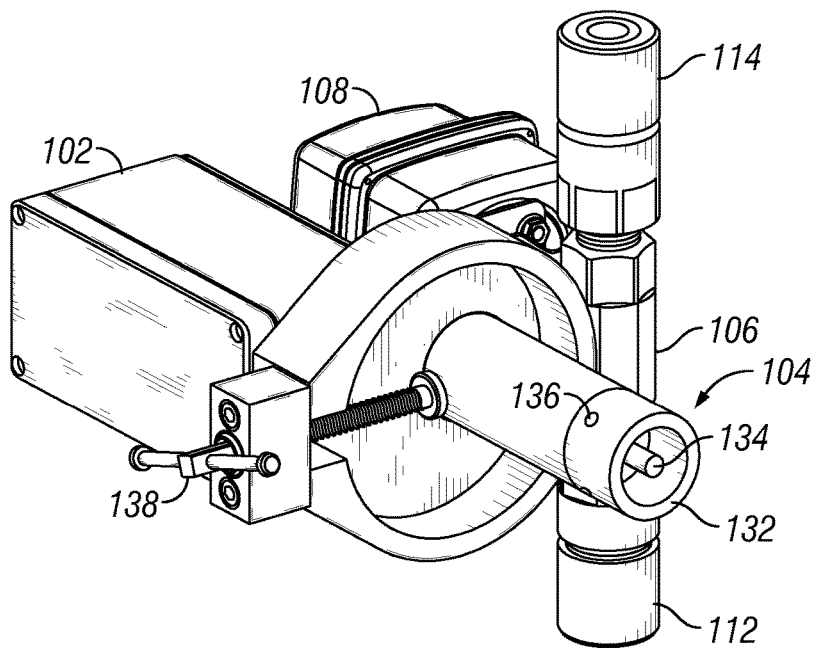
FIGS. 5 and 6 are 3-D views of the bottom of the electric fuel flow control device of FIGS. 1-4 in accordance with an embodiment of the disclosure.
Figure 6:
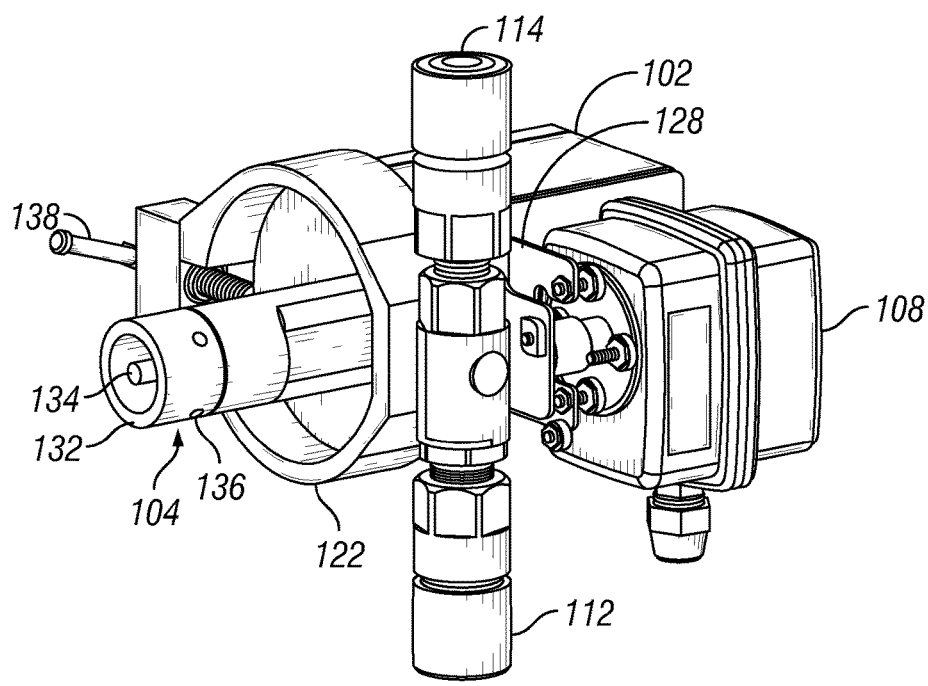

Embodiments of the disclosure include an electric fuel flow control device for use with oil and gas equipment, such as fueling systems for frac pumps. Components of the electric fuel flow control device 100 are shown in FIGS. 1-6 and described below. FIGS. 1-3 depict 3-D views of an electric fuel flow control device 100 in accordance with an embodiment of the disclosure. FIG. 4 depicts a 3-D close-up view of a portion of the electric fuel flow control device 100 in accordance with an embodiment of the disclosure. FIGS. 5 and 6 are a 3-D views of the bottom of the electric fuel flow control device 100 in accordance with an embodiment of the disclosure.

The electric fuel flow control device 100 includes an electronics enclosure 102 that encloses control circuitry and a battery, an electric fluid sensor 104, a motorized ball valve 106 and ball valve actuator 108, a ball valve position indicator 110, quick connects 112 and 114 on both sides of the motorized ball valve, a beacon light 116, a status light 118, a button 120, an adapter cap 122 enabling connection to a fuel tank, and a mandrel 124.

The electronics enclosure 102 may include one or more batteries. In some embodiments, the electronics enclosure 102 includes three D cell batteries. In other embodiments, other batteries may be included. Additionally or alternatively, the electric fuel flow control device 100 may be powered by other power sources, such as on-board batteries or solar power.

The control circuitry in the electronics enclosure 102 may include hardware and/or software logic to control the operation of the electric fuel flow control device 100, such as the operation of the electric fluid sensor 104 and the motorized ball valve 106. For example, in some embodiments the control circuitry may include a programmable microcontroller or a field programmable gate array (FPGA). The control circuitry may have different configurations depending on the desired operation of the electric fuel flow control device 100. In some embodiments, the control circuitry includes or is implemented on a circuit board. The control circuitry may also include a radio receiver, transmitter, or transceiver for radio communication, such as with personnel at the wellsite or a communication hub. In some embodiments, the control circuitry may include a network interface for communication over various networks. In such embodiments, the electric fuel flow control device 100 may communicate a status to a remote device. The status may be communicated periodically, in response to a change in operation of the device 100, or a combination thereof. In some embodiments, the control circuitry enables hands free and automatic operation of the electric fuel flow control device 100. In some embodiments, the control circuitry initiates a battery function test periodically or on demand. In such embodiments, the control circuitry may initiate a notification if a battery fails. In some embodiments, the notification includes flashing the beacon light 116 in a pattern (for example, 3 times every 15 seconds).

The electronics enclosure 102 that encloses the control circuitry may be weatherproof and enclose other components of the electric fuel flow control device 100. In some embodiments, the electronics enclosure 102 may enclose the battery and may include connections to other components of the electric fuel flow control device 100, such as connections to the electric fluid sensor 104, the motorized ball valve 106, the beacon light 116, the status light 118, and the button 120. For example, in some embodiments a sensor wire may be coupled to a side of the electronics enclosure 102 and enable electrical communication with the electric fluid sensor 104. In some embodiments, a valve control wire may be coupled to a side of the electronics enclosure 102 (for example, via valve control wire connector 125) and enable electrical communication with the motorized ball valve 106. In some embodiments, the electronics enclosure 102 includes a removable lid 126 that provides access to the interior of the electronics enclosure 102 but seals the enclosure 102 from liquids and particulates such as dust when attached. The removable lid 126 may be secured to another portion of the electronics enclosure 102 via fasteners (for example, screws).

The electric fuel flow control device 100 includes a dampening bracket 128 that secures the electronics enclosure 102 (that is, to secure the internal components such as the control circuity and battery), ball valve 106, ball valve actuator 108, and other components of the electric fuel flow control device 100. The bracket 128 may reduce or eliminate vibration of components during handling and operation of the electric fuel flow control device 100. The bracket 128 may be secured to the electronics enclosure 102, ball valve 106, ball valve actuator 108, and other components via fasteners 130 such as bolts, screws, or other suitable fasteners.

The electric fluid sensor 104 may be formed from stainless steel and may have dimensions that reduces the footprint of the electric fuel flow control device 100. In some embodiments, the electric fluid sensor 104 is housed in a sensor housing 132 and includes a shaft 134 inside the sensor housing 132. The shaft 134 includes an opening (for example, a slot or a notch). The electric fluid sensor 104 transmits an ultrasonic signal across the opening that is only detectable when the opening is immersed in fluid, thus indicating that fluid is present. As shown in the figures, the sensor housing 132 includes holes 136 to allow fluid into the sensor housing 132 to contact the shaft 134.

In other embodiments, other sensing devices or technologies may be used to detect the presence of fluid instead of the electric fluid sensor 104. For example, in other embodiments the electric fuel flow control device 100 may include a vibration sensor, a pressure transducer, radar, a rod sensor, a float switch, or other types of sensing devices or technologies.

The motorized ball valve 106 may be configured to move between a closed position that shuts off fuel flow and an open position that enables fuel flow. The movement between the open position and closed position may be controlled by the control circuity in response to a signal from the electric fluid sensor 104. In some embodiments, the motorized ball valve 106 includes an electric motor (included in or housed in the ball valve actuator 108) and a stainless steel ball valve. In other embodiments, the ball valve may be formed from brass or carbon steel. The electric motor may open and close the ball valve 106 to enable movement between the open position and closed position. In some embodiments, the motorized ball valve 106 includes the valve position indicator 110, such as on top of the ball valve actuator 108, which indicates whether the motorized ball valve 106 is open or closed. The valve position indicator 110 may enable a technician to visually verify the position of the motorized ball valve 106. In other embodiments, other types of valves may be used instead of the motorized ball valve 106. For example, in other embodiments the electric fuel flow control device 100 may include a solenoid valve, a pneumatic valve, or other type of valve instead of the motorized ball valve 106.

In some embodiments, the beacon light 116 is a light emitting diode (LED), such as a red LED. In other embodiments, other types of lights may be used. In some embodiments, the beacon light 116 is positioned to be visible from all sides of the electric fuel flow control device 100, such as on top of the electronics enclosure 102. In some embodiments, the beacon light 116 provides an indicator for notifications (for example, alarms) of the electric fuel flow control device 100. For example, in some embodiment beacon light 116 indicates when the fluid sensor 104 has sensed fluid and the motorized ball valve is moved to the closed position. The beacon light 116 may also indicate other alarms such as a low battery.

In some embodiments, the status light 118 is a light emitting diode (LED), such as a green LED. In other embodiments, other types of lights may be used. In some embodiments, the status light 118 is positioned to be visible from all sides of the electric fuel flow control device 100, such as on top of the electronics enclosure 102. In some embodiments, the status light 118 provides an indicator of activity of the electric fuel flow control device 100. For example, in some embodiments the status light 118 may flash each time the control circuitry receives or obtains a signal from the electric fluid sensor 104. In some embodiments, the status light 118 may flash when the button of the electric fuel flow control device 100 is pushed. In some embodiments, the status light 118 may flash periodically to indicate normal operating conditions.

The button 120 may be weatherproof and may initiate one or more functions of the electric fuel flow control device 100. In some embodiments, the button 120 may perform different functions based on the duration of a button press. For example, in some embodiments pushing the button 120 for a first duration (such as less than 1 second) may initiate obtaining a signal from the electric fluid sensor 104 (that is, immediate activation of the electric fluid sensor 104), such as to test the function of the device 100 based on whether the electric fluid sensor 104 was submerged in fluid or dry. In another example, pushing the button 120 for a second duration (such as greater than 3 seconds) may reset the motorized ball valve 106 to the open position. It should be appreciated that the button 120 may be programmed to perform different or additional functions.

The adaptor cap 122 may include holes for the bracket 128 to secure the motorized ball valve 106 and electronics enclosure 102, a sliding clamp 138 to clamp the electric fuel flow control device 100 on a fuel tank (for example, by coupling to a fill neck), and holes for wires and fasteners.

The mandrel 124 may set the depth of the electric fluid sensor 104 in a fuel tank and may be different lengths for different fuel tanks. The mandrel 124 couples the adapter cap 122 to the sensor housing 132 and allows a sensor wire to pass through the mandrel 124 and into the wire connector 140, allowing the sensor wire to pass through the adaptor cap 122 while sealing the interior of the mandrel 124 from fluid and debris. The mandrel 124 may include one or more sealing components (for example, o-rings) to prevent fluid from entering components of the electric fuel flow control device 100.

The interior of the sensor housing 132 may include a threaded connection that, in some embodiments, may also include a sealing component (for example, an o-ring), such that the sensor shaft protrudes from the bottom of the housing. The sensor housing may include a shaft housing that protects the shaft of the sensor and includes openings 136 to enable fluid to enter the housing and contact the sensor shaft. In some embodiments, the shaft housing may have a length longer than the sensor shaft to protect the end of the sensor shaft.

Advantageously, the electric fuel flow control device 100 may run solely on battery power without using solar power or other external power sources. In some embodiments, the battery may be of sufficient capacity to enable the electric fuel flow control device 100 to operate for a time period of at least 5 years. Moreover, the electric fuel flow control device 100 is compact and does not require any external connections or signals to operate. For example, the electric fuel flow control device 100 does not require a cable or a central control unit and eliminates the risk of a bad cable or network connection. Thus, the electric fuel flow control device 100 may function alone without any other devices and does not require proximity to any other devices (that is, it may operate at unlimited distances).

In some embodiments, the electric fuel flow control device 100 may be used with a gravity fed fuel system having a float valve, such as that described in U.S. Pat. No. 10,604,403 a copy of which is incorporated by reference in its entirety. In such embodiments, the electric fuel flow control device 100 may be used as a primary fuel flow control device, as a backup fuel control device, or both.

Figure 7:
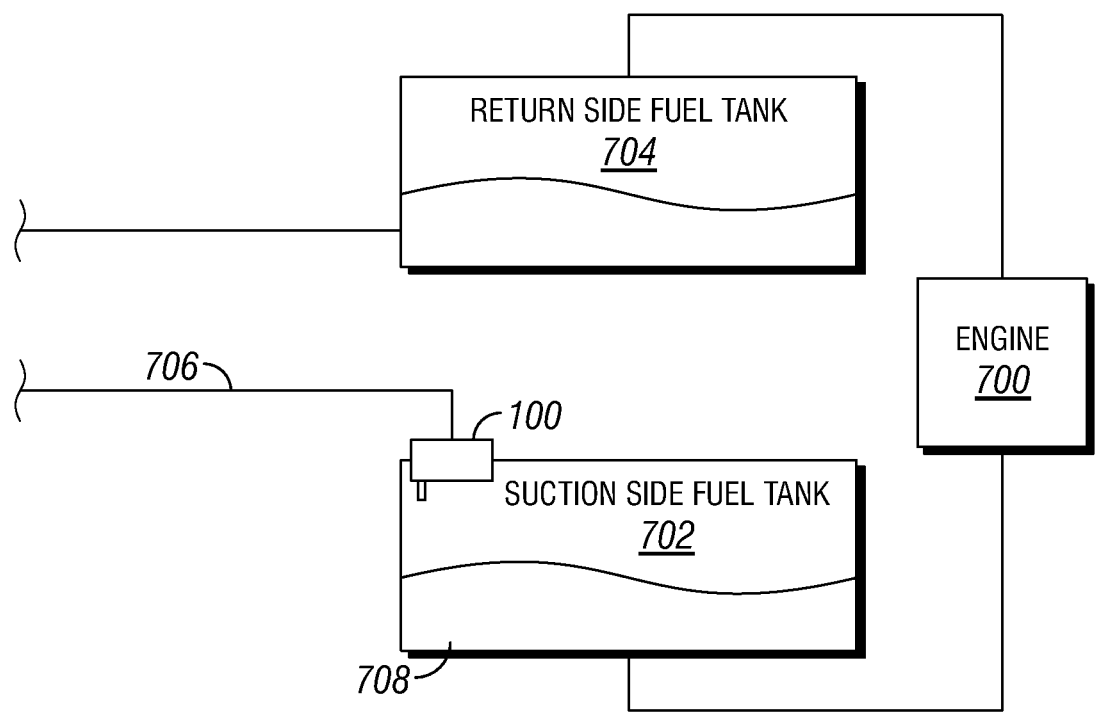
FIG. 7 is a schematic diagram of the installation of an electric fuel flow control device as a primary fuel flow control device in accordance with an embodiment of the disclosure.

In some embodiments, the electric fuel flow control device 100 may be used as a primary fuel flow control device in a gravity fed fuel system or other type of fuel system (for example, a pump-based system). FIG. 7 depicts the electric fuel flow control device 100 as a primary fuel flow control device for fueling an engine 700 having a suction side fuel tank 702 and a return side fuel tank 704 in accordance with an embodiment of the invention. In such embodiments, fuel may flow from the gravity unit or other unit, through the main lines into a feeder line 706, and through the electric fuel flow control device 100 into a suction side fuel tank 702. When the electric fuel sensor 104 senses fuel (that is, when the fuel 708 in the tank 702 has reached a desired level), the electric fuel flow control device 100 may move the motorized ball valve 106 to the closed position and stop the flow of fuel. As the engine 700 uses fuel, the electric fuel sensor 104 becomes dry and does not sense any fuel. In response to a signal received or obtained from the electric fuel sensor 104, the electric fuel flow control device 100 may move the motorized ball valve 106 to the open position and enable the flow of fuel to refill the fuel tank 702. In some embodiments, a second electric fuel sensor may also be used to sense low fuel and high fuel levels in the fuel tank 702 and operate the motorized ball valve accordingly.

Figure 8:
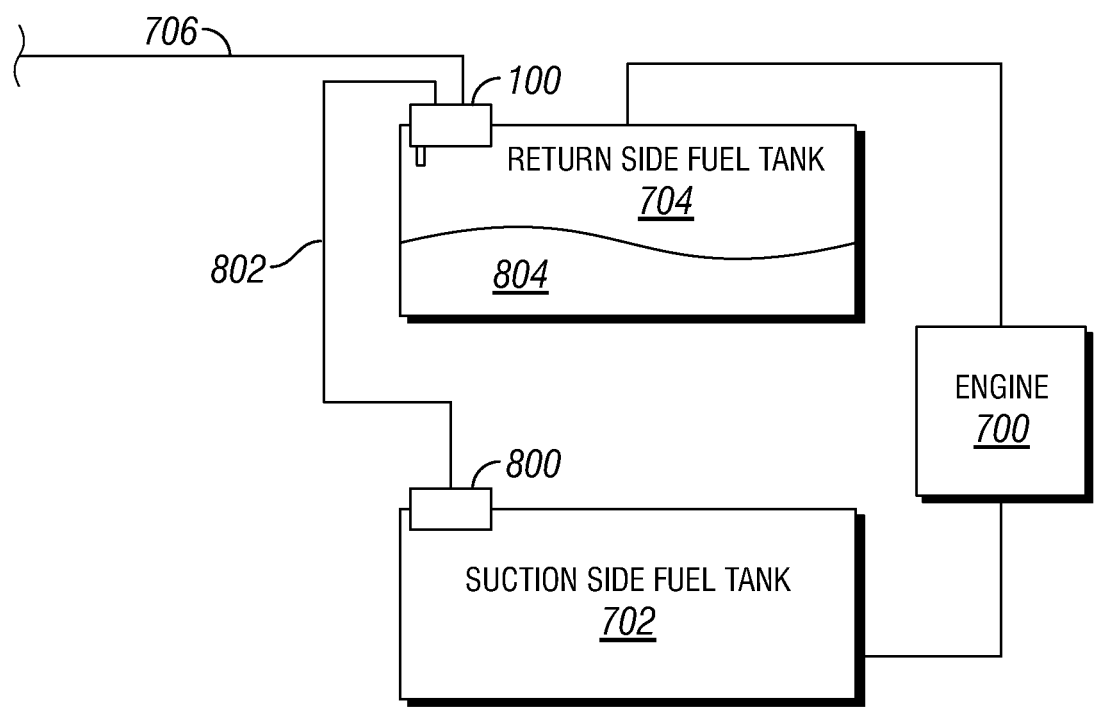
FIG. 8 is a schematic diagram of the installation of an electric fuel flow control device as a secondary fuel flow control device in accordance with an embodiment of the disclosure.

In alternative embodiments, the electric fuel flow control device 100 may be used as a backup fuel control device. FIG. 8 depicts the electric fuel flow control device 100 as a backup fuel flow control device for fueling the engine 700 having the suction side fuel tank 702 and the return side fuel tank 704 in accordance with an embodiment of the invention. In such embodiments, fuel may flow from the gravity unit, through the main lines into the feeder line 706, through the electric fuel flow control device 100, and then into a primary fuel flow control device (for example, a float valve 800). Fuel will flow either direction through quick connects 112 and 114 and through the motorized ball valve 106 which is not sensitive to flow direction. The electric fuel flow control device 100 may be coupled to the return side fuel tank 704 and have a short discharge line 802 connecting the outlet of the electric fuel flow device 100 and the inlet of the primary fuel control device 800. If the primary fuel control device fails, the electric fuel sensor 104 in the return side fuel tank 704 (which is typically equalized with the primary suction side fuel tank 702) may sense fuel 804 indicating that the tank is overfull. In response, the electric fuel flow control device 100 may move the motorized ball valve 106 to the closed position and stop the flow of fuel to the primary fuel control device 800, thus preventing a potential spill.

In some embodiments, the electric fuel flow control device 100 may be configured as a backup fuel flow control device that automatically resets to an open position when the electric fuel sensor 104 becomes dry and does not sense any fuel.

In other embodiments, the electric fuel flow control device 100 may be used as both a primary fuel flow control device and as a backup fuel flow control device in a gravity fed fuel system.

In other embodiments, the electric fuel flow control device 100 may be used as a primary fuel flow control device or as a backup fuel flow control device in other fuel systems (for example, pump-based fuel systems or other types of fuel supply). For example, in some embodiments, the electric fuel flow control device 100 may be used a primary fuel flow control device on a fuel tank and be connected to a feeder line supplied by various fuel supply technologies. In another example, the electric fuel flow control device 100 may be used as a primary or secondary fuel shutoff on a pump-supplied automated fuel system.

Installation of the electric fuel flow control device 100 will be described with reference to a gravity fed fuel system having a float valve, such as that described in U.S. Pat. No. 10,604,043. However, it should be appreciated that the installation procedure described herein may be applicable and similar to other types of fuel systems. Advantageously, the electric fuel flow control device 100 may provide backup or independent control of fuel flow for fracking equipment or other oil and gas operations equipment.

Initially, the electric fuel flow control device 100 may be delivered in a package (for example, a box) to a wellsite or other location where the electric fuel flow control device 100 is to be used, and removed from the package when ready for installation.

In some embodiments, the electric fuel flow control device 100 may remain permanently on (such that all components are operational and cannot be unpowered from the power source). In other embodiments, the electric fuel flow control device 100 may include an on/off control (for example, an on/off switch or a specific configuration of the button 120). Before use, the electric fuel flow control device 100 may be cleaned. After cleaning, the sensor shaft 134 of the electric fuel flow control device 100 may be submerged in fuel (for example, diesel). When the sensor 104 detects fuel and provides a signal, the electric fuel flow control device 100 may provide an indication (for example, a single flash of the status light 118), move the motorized ball valve 106 to the closed position, and then provide another indication (for example, flashing the beacon light 116). The sequence of indications may indicate to a technician that the electric fuel flow control device 100 is operating properly. In some embodiments, the button 120 may be depressed at any time to force the sensor 104 to obtain a reading and send a signal (as opposed to waiting for a period sampling). The sensor reading may be indicated by the beacon light 116.

After the electric fuel flow control device 100 indicated proper operation, the electric fuel flow control device 100 may be reset. In some embodiments, a technician may reset the electric fuel flow control device 100 by depressing the button 120 for at least 3 seconds while the sensor shaft 134 is submerged. In some embodiments, the electric fuel flow control device 100 may also provide an indication (such as flashing of the status light 118). In some embodiments, the electric fuel flow control device 100 will not reset while submerged but will indicate the button 120 was depressed for the reset time period by a flash of the status light 118. Next, the technician may remove the electric fuel flow control device 100 from the testing fuel and depress the button 120 for at least 3 seconds. The electric fuel flow control device 100 may move the motorized ball valve 106 to the open position and provide an indication (for example, by flashing the status light 118 and turning off the beacon light 116).

After testing operation of the electric fuel flow control device 100, the device may be installed on the return side fuel tank of an engine (as opposed to the suction side fuel tank the engine pulls fuel from). The electric fuel flow control device 100 may be clamped onto the fill neck of the return side fuel tank using the sliding clamp 138 on the adapter cap 122. In some embodiments, a plate adapter may be used if the fill neck does not protrude enough to fit the sliding clamp 138.

Next, a feeder line from main line may be connected to the inlet side of the electric fuel flow control device 100 (either side of the motorized ball valve 106 is usable as inlet as the motorized ball valve 106 is not sensitive to flow direction). A short discharge line may be connected from the outlet side of the electric fuel flow control device 100 to the inlet of a float valve included on the suction side tank of the engine.

The electric fuel flow control device 100 may be manually and periodically checked (for example, every $_{30}$ minutes) by observing the status. In some embodiments, the electric fuel flow control device 100 may be checked remotely. Additionally, operation of the electric fuel flow control device 100 may be checked by observing an indication of fuel sensor operation (for example, flashing of the status light 118 or 116).

If the electric fuel flow control device 100 indicates an alarm (for example, by flashing the beacon light), the gravity fed fuel system may be diagnosed and the electric fuel flow control device 100 may be reset when the system has returned to normal operation and the fuel tank is at a normal level.

In embodiments in which the electric fuel flow control device 100 is used a primary fuel flow control device, the installation procedure may be similar to that described above. In such embodiments, the electric fuel flow control device 100 may be installed on the suction side of an engine such that fuel may flow into the inlet side of the electric fuel flow control device 100, out of the outlet side of the electric fuel flow control device 100, and into the suction side fuel tank. In some embodiments, the electric fuel flow control device 100 may be configured to indicate when the electric fuel sensor does not sense fuel for a specific time period (for example, by flashing the beacon light 116).

As discussed above, in some embodiments, a first electric fuel flow control device may be installed on the suction side fuel tank as a primary fuel flow control device and a second electric fuel flow control device may be installed on the return side fuel tank as a backup fuel flow control device.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A fuel flow control device, comprising:
   an enclosure containing control circuitry;
   a valve having an inlet and an outlet, the valve moveable between an open position and a closed position, the open position configured to permit fuel flow through the valve and the closed position configured to block fuel flow through the valve;
   a valve actuator operable to move the valve between the open position and the closed position;
   an electric fuel sensor disposed in a sensor housing and comprising a shaft, the shaft comprising a slot such that the electric fuel sensor senses fuel when the slot is submerged in fuel;
   an adapter cap configured to couple the fuel flow control device to the fuel tank; and
   a battery configured to power the control circuitry, the valve actuator, and the electric fuel sensor,
   wherein the control circuitry comprises logic configured to move the valve between the open position and the closed position in response to a signal provided by the electric fuel sensor.

2. The fuel flow control device of claim 1, comprising a first light and second light, the first light configured to indicate an alarm and the second light configured to indicate operation of the electric fuel sensor.

3. The fuel flow control device of claim 1, wherein the valve comprises a motorized ball valve.

4. The fuel flow control device of claim 1, comprising a sliding clamp configured to couple the fuel flow control device to a fuel tank.

5. The fuel flow control device of claim 1, comprising a bracket coupled to the enclosure, the adapter cap, and the valve actuator.

6. The fuel flow control device of claim 1, comprising a button configured to initiate operation of the electric fuel sensor.

7. The fuel flow control device of claim 6, wherein the button is further configured to reset the valve to the open position.

8. The fuel flow control device of claim 1, wherein the valve comprises a solenoid valve.

9. The fuel flow control device of claim 8, comprising a mandrel coupled to the electric fuel sensor, the mandrel configured to adjust the depth of the electric fuel sensor in the fuel tank.

10. A method of controlling fuel provided to a fuel tank, comprising
    using a fuel flow control device coupled to the fuel tank, the fuel flow control device operable to stop the flow of fuel between an inlet and an outlet when the fuel flow control device detects fuel via an electric fuel sensor extending into the fuel tank, the fuel flow control device comprising:
    an enclosure containing control circuitry;
    a valve having the inlet and the outlet, the valve moveable between an open position and a closed position, the open position configured to permit fuel flow through the valve and the closed position configured to block fuel flow through the valve;
a valve actuator operable to move the valve between the open position and the closed position;
the electric fuel sensor disposed in a sensor housing and comprising a shaft extending into the fuel tank, the shaft comprising a slot such that the electric fuel sensor senses fuel when the slot is submerged in fuel;
an adapter cap configured to couple the fuel flow control device to the fuel tank; and
a battery configured to power the control circuitry, the valve actuator, and the electric fuel sensor.

11. The method of claim 10, wherein the fuel tank comprises a fuel tank located on the suction side of an engine.

12. The method of claim 10, wherein the fuel tank comprises a fuel tank located on the return side of an engine.

13. The method of claim 10, wherein the fuel flow control device is connected to a feeder line of a gravity fed fuel system.

14. The method of claim 10, wherein the fuel flow control device is connected to a feeder line of a pump powered fuel system.

15. The method of claim 10, wherein the valve comprises a motorized ball valve.

16. A system, comprising:
an engine connected to a fuel tank;
a fuel flow control device coupled to the fuel tank, the fuel flow control device comprising:
an enclosure containing control circuitry;
a valve having an inlet and an outlet, the valve moveable between an open position and a closed position, the open position configured to permit fuel flow through the valve and the closed position configured to block fuel flow through the valve;
a valve actuator operable to move the valve between the open position and the closed position;
the electric fuel sensor disposed in a sensor housing and comprising a shaft extending into the fuel tank, the shaft comprising a slot such that the electric fuel sensor senses fuel when the slot is submerged in fuel;
an adapter cap configured to couple the fuel flow control device to the fuel tank; and
a battery configured to power the control circuitry, the valve actuator, and the electric fuel sensor,
wherein the control circuitry comprises logic configured to move the valve between the open position and the closed position in response to a signal provided by the electric fuel sensor.

17. The system of claim 16, wherein the fuel tank comprises a suction side fuel tank located on the suction side of the engine.

18. The system of claim 16, wherein the fuel tank comprises a return side fuel tank comprises a return side fuel tank located on the return side of the engine.

19. The system of claim 16, wherein the engine provides power to a fracturing fluid pump.

20. The system of claim 16, wherein the valve comprises a motorized ball valve.

21. A fuel flow control device, comprising:
an enclosure containing control circuitry;
a valve having an inlet and an outlet, the valve moveable between an open position and a closed position, the open position configured to permit fuel flow through the valve and the closed position configured to block fuel flow through the valve;
a valve actuator operable to move the valve between the open position and the closed position;
means for sensing fluid in a fuel tank and generating a signal in response thereto; and
an adapter cap configured to couple the fuel flow control device to the fuel tank;
wherein the control circuitry comprises logic configured to move the valve between the open position and the closed position in response to the signal.

* * * * *